No. 739,015. PATENTED SEPT. 15, 1903.
A. B. LOOMIS.
VALVE LOCK AND ADJUSTER.
APPLICATION FILED SEPT. 10, 1902.
NO MODEL.
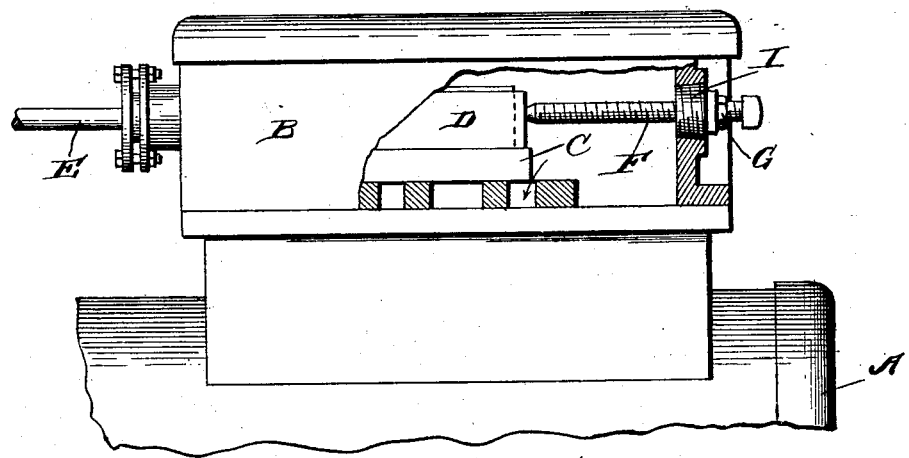
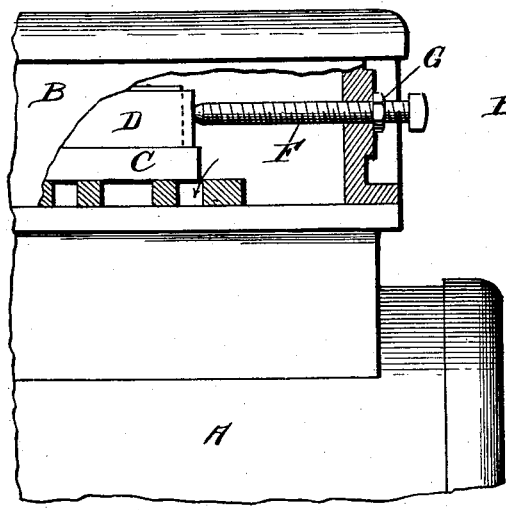 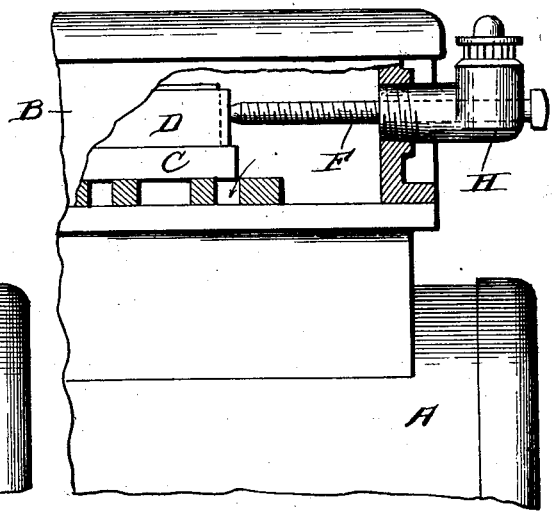
Witnesses
Louis D. Heinrichs
L. H. Monroe
Inventor
Arthur B. Loomis
By his Attorney No. 739,015.

Patented September 15, 1903.

UNITED STATES PATENT OFFICE.

ARTHUR B. LOOMIS, OF SCRANTON, PENNSYLVANIA.

VALVE LOCK AND ADJUSTER.

SPECIFICATION forming part of Letters Patent No. 739,015, dated September 15, 1903.

Application filed September 10, 1902. Serial No. 122,776. (No model.)

*To all whom it may concern:*

Be it known that I, ARTHUR B. LOOMIS, a citizen of the United States, residing at Scranton, county of Lackawanna, and State of Pennsylvania, have invented a certain new and useful Improvement in Valve Locks and Adjusters, of which the following is a specification.

My invention relates to a new and useful improvement in a valve lock and adjuster, and has for its object to provide a device to be used in connection with slide-valves of engines, particularly locomotives, for the purpose of locking the slide-valve in position when a breakdown has occurred or in moving the slide-valve so as to allow steam access behind the piston to relieve the driving-wheel from a dead-center.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of a steam-chest, a portion of which is broken away to show my invention in operation; Fig. 2, a similar view to Fig. 1, showing my invention used in a steam-chest in which a relief-valve is not used; Fig. 3, a similar view to Figs. 1 and 2, showing my invention used in connection with a relief-valve; Fig. 4, a side elevation of my invention complete.

A represents the cylinder, and B the steam-chest.

C is the slide-valve, and D is the yoke surrounding the slide-valve, to which the valve-stem E is connected.

Referring to Fig. 2, my invention consists of a threaded adjusting-screw F, threaded through the end of the steam-chest opposite the stuffing-box of the valve-stem. This adjusting-screw F is so adjusted that the inner end is out of range with the movements of the valve when the engine is operating normally; but in case of a breakdown upon one side of the engine it is unnecessary to disconnect the main rod, as the adjusting-screw may be threaded through the steam-chest until the inner end is in contact with the valve, and the valve may be adjusted so as to leave a slight opening between the steam-chest and the end port to allow lubrication of the cylinder, and the adjusting-screw will hold the valve in this position. A jam-nut G is threaded upon the screw which is adapted to jam against the end of the steam-chest to prevent accidental displacement of the screw F. It will thus be seen that the valve upon the damaged side of the locomotive may be locked in a very few minutes and the locomotive may proceed upon its way, utilizing the other cylinder, and if the engine should get on the dead-center on the operating side, so that the locomotive cannot start, steam may be admitted behind the piston upon the other or dead side by moving the valve by means of the adjusting-screw so as to allow steam to enter the port, and after the locomotive is moving the dead valve may be locked in place again, and the whole operation has consumed only a short time and does away with the heavy pinch-bar that is now used by engines for moving the locomotive off of the dead-center.

If the valve-stem upon one side should break off at the yoke, the valve may be locked in place by clamping the valve-stem in the packing-gland and forcing the adjusting-screw against the valve upon the opposite end and the locomotive can then proceed. This does away with lifting heavy steam-chest cover and blocking each side of the valve, so that the ports will be covered.

When relief-valves are placed in the end of the steam-chest, as shown at H in Fig. 3, the relief-valve may be bored and interiorly threaded to receive the adjusting-screw F, and this adjusting-screw can then be used the same as before described, and shown in Fig. 2. If the relief-valve should become broken, said relief-valve may be removed from the steam-chest and in its place is inserted a screw-threaded plug I, which is bored and interiorly threaded to receive the screw F. The screw F is then removed from the relief-valve and threaded through the plug and can then be utilized as before described.

The advantage of my improvement is that in case of a breakdown to the locomotive upon the road it does away with disconnecting the main rods, as a valve can be held in position to feed the cylinder from the lubricator by giving the valve a slight opening through front port to cylinder. It will also hold a valve in position if the valve-stem is broken from the yoke, and, in fact, the valve can be moved to any position desired and locked in such position, and the operation will only consume a comparatively short period of time and in many cases will allow the locomotive to proceed on its way on its own steam, where otherwise it would be necessary to haul the locomotive back to the shops.

Of course I do not wish to be limited to the exact construction here shown, as slight modifications could be made without departing from the spirit of my invention.

Having thus fully described my invention, what I claim as new and useful is—

1. In combination with a steam-chest and slide-valve, a screw threaded through the end of the steam-chest, the inner end of said screw adapted to be brought in contact with the slide-valve for the purpose of moving the valve to any position and holding the same in such position, a jam-nut threaded upon the screw and adapted to be jammed against the end of the steam-chest, as and for the purpose specified.

2. In combination, a slide-valve, a steam-chest, said steam-chest provided with an interiorly-threaded opening in one end in which the relief-valve is normally threaded, an exteriorly-threaded plug adapted to be inserted in said opening when the relief-valve is removed, a screw threaded through said plug, the inner end of said screw adapted to be brought in contact with the slide-valve, and a jam-nut threaded upon the screw upon the outside of the steam-chest, as specified.

In testimony whereof I have hereunto affixed my signature in the presence of two subscribing witnesses.

ARTHUR B. LOOMIS.

Witnesses:
 RICHARD J. BOURKE,
 THOMAS A. JORDAN.